July 22, 1958

E. A. SHELTON 2,844,271

PRESSURE TANK

Filed March 14, 1955

INVENTOR.
EDGAR A. SHELTON
BY
Floyd Trimble
ATTORNEY

United States Patent Office 2,844,271
Patented July 22, 1958

2,844,271

PRESSURE TANK

Edgar A. Shelton, Ponca City, Okla., assignor to Continental Oil Company, Ponca City, Okla., a corporation of Delaware Application March 14, 1955, Serial No. 493,955

2 Claims. (Cl. 220—3)

This invention relates to new constructions for pressure tanks. More specifically, the invention provides new and useful pressure tanks having several advantageous features of strength and safety not found in such tanks in the prior art.

In many plants, tanks are used for storing and reacting fluids under very high pressures, and these fluids are often corrosive, volatile and highly inflammable. When one of these tanks develops a leak, the fluids escape from the tank often causing hazardous flash fires.

It is, therefore, the principal object of this invention to provide a pressure vessel better adapted to withstand a tangential tensile stress than are vessels constructed in accordance with the prior art.

It is a further object of this invention to provide means associated with such pressure vessels for indicating when the walls of the vessel develop leaks, said indication being given at a time well before fluids actually escape from the vessel.

It is a further object of this invention to provide a pressure vessel as described above which is easily adapted to use as a heat exchanger.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however of but a few of the various ways in which the principle of the invention may be employed.

Broadly stated, my invention comprises a pressure tank comprising a wall, encompassing a chamber for the retention of a fluid under pressure, said wall having a cavity therein which is independent of said chambers; means for maintaining a fluid in such cavity at a pressure different from the pressure of the fluid inside said chamber; and means for indicating when the pressure in said cavity varies from a predetermined range.

Figure 1:
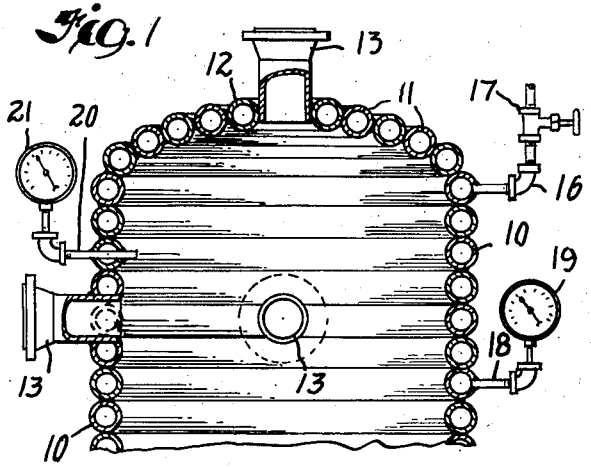
Fig. 1 is a longitudinal sectional view of the preferred form of my invention.
Figure 2:
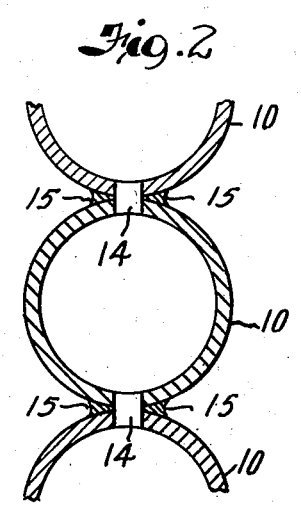
Fig. 2 is a sectional view of a fragment of the wall of this form.

With reference now to Fig. 1, the preferred form of the pressure tank of my invention comprises a plurality of closed circular sections of pipe 10. The ends of the tank are made up of pipe sections 11 similar to the sections 10 but of diameters smaller than the diameter of the sections 10. The most remote sections 12, having the smallest diameter, fit snugly around conduits 13 into the ends of the tank. Each of the pipe sections 10, 11 and 12, except the sections 11 and 12 on one end of the tank, contain at least one port 14 therein which connects with similar ports in the adjacent pipe sections as illustrated in Fig. 2. Preferably each of the sections contain four ports 14 equally spaced around the section. The walls of the adjacent pipe sections 10, 11 and 12 are held together by a weld 15, and the remote sections 12 are welded to the conduit 13. Leading from the section 12 on one end of the tank and from the remote section 10 on the other end of the tank, here illustrated as the top end, are two conduits 16 which contain valves 17. Two conduits 13, similar to the conduits 13 in the ends of the tank, are provided in the sides of the tank and are sealed to the tank by internal and external welds. Leading from one central pipe section 10, or as an alternative form one of the conduits 16 is a conduit 18 connected to a pressure gauge 19. Leading through one of the pipe sections 10 from the chamber of the tank is a conduit 20 connected to a pressure gauge 21. The gauges 19 and 21 are preferably so located that they can be viewed at the same time. The tank is supported by a cylindrical skirt or alternately legs or columns welded to the bottom pipe section 10 of the tank.

As an alternative to the gauges 19 and 21, a single mechanism may be provided which would close an electric circuit when the pressures in the conduits 18 and 20 are equal. A light or bell would be provided in this electric circuit so that the fact that the pressures in the conduits 18 and 20 were equal would be readily apparent to anyone near the tank.

The gauges 19 and 21, or the alternative electric circuit, are described as safety features on the tank and need not always be employed.

In order for the cavity in the pipe sections to be separate from the tank chamber, it is necessary that the tank chamber should not be connected with any of the ports 14, and if this is to be the case, the weld 15 must fill the space on the inside of the tank between the adjacent pipe sections that are connected by ports 14. Since this welding must be done on the inside of the tank and since it would be very difficult, if possible at all, on tanks of extremely small diameter not provided with manways, to accomplish such interior welding after all the pipe sections have been put in place, the pipe sections 11 and 12 on one end of the tank do not contain the ports 14 and are welded only from the outside. Hence, the conduit 16 at the top of the tank in Fig. 1 leads from the top section 10 rather than from the top section 12.

If it were desirable on such small diameter tanks to have the cavity in the pipe sections continuous over the entire tank, the tank should be constructed in two halves with all the sections in each half connected by ports 14, that is, each half being similar to the lower half of the tank illustrated in Fig. 1, but in each of these halves, the side of the section 10 which is to be welded to the other half should not contain a port 14. The two halves are then welded together by an external weld and the pipe sections on either side of this central weld are connected by an external conduit.

Figure 3:
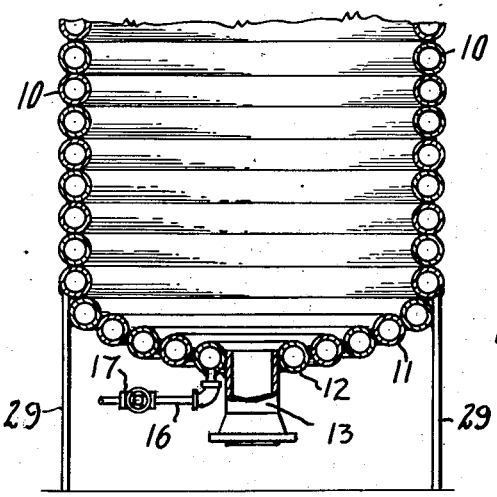
Fig. 3 is a sectional view of a fragment of a variation of this form of my invention.
Figure 3:
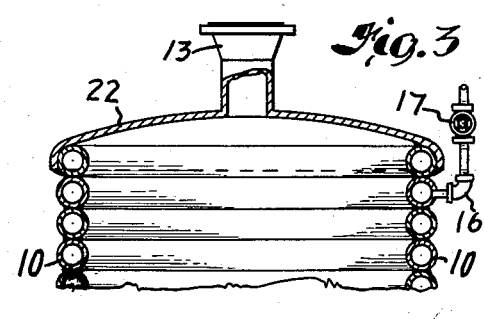

Fig. 3 illustrates a construction for my invention identical to that illustrated in Fig. 1 except that the pipe sections 11 and 12 of the apparatus of Fig. 1 are not used, and instead the end of the tank is formed by a domed head 22 which is welded to the remote pipe sections 10. In this construction the conduits 16, valves 17 and the gauges 19 and 21 are provided as they were in the apparatus of Fig. 1, and the conduits 13 are provided in the heads 22.

Figure 4:
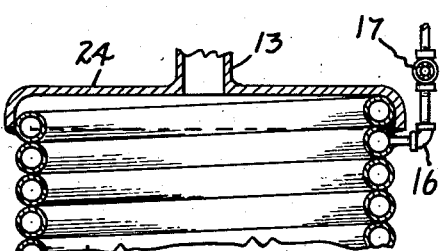
Fig. 4 is a longitudinal sectional view of a fragment of an alternative form of my invention.

With reference now to Fig. 4, this alternative form of my invention is constructed of a continuous pipe 23 wound in a helix. The ends of the pipe 23 are sealed closed by any suitable means, and the walls of the adjacent turns of the helical pipe are welded together. The top and bottom of the tank are covered by flat heads 24 which are welded to the remote turns of the helical pipe 23. The heads 24 contain conduits 13 similar to the conduits 13 in Fig. 1, and this construction of the tank is provided with the conduits 16, the valves 17, and the gauges 19 and 21 in the same way as was the tank in Fig. 1. It should here be noted that because the wall of this construction of my invention is made of a continuous pipe, the ports 14 described in reference to Fig. 1 are not necessary, and similarly, the internal welds between adjacent turns of the helix are not necessary. It should also be noted that instead of closing the ends of the tank by means of the heads 24, the tank could be closed by decreasing the diameter of the remote turns of the helix so that the end turns of the helix fit snugly around and are welded to the conduits 13.

Figure 5:
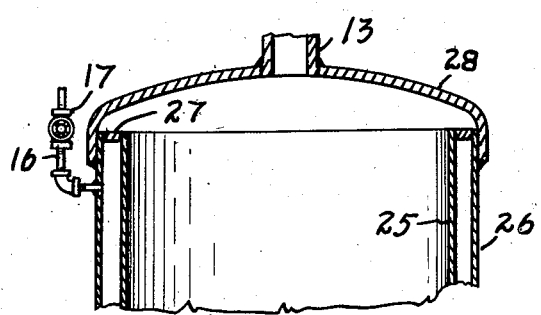
Fig. 5 is a longitudinal sectional view of a fragment of another alternative form of my invention.

With reference now to Fig. 5, this form of my invention is constructed of a cylinder having an inner wall 25, an outer wall 26, and two discs 27 which seal the space between the walls 25 and 26 at the top and bottom of the cylinder. Covering the top and bottom of the cylinder are two heads 28 which are welded to the outside of the wall 26. These heads 28 contain conduits 13 leading therefrom as did the heads described with reference to the other forms of this invention. Leading through the outer wall 26 are two conduits 16 containing valves 17 similar to the conduits 16 and valves 17 employed in all the other forms of my invention. Leading through the wall 26 is a conduit 18 connected to an external pressure gauge 19, and leading through both walls 25 and 26 is conduit 20 connected to a pressure gauge 21.

Throughout this specification and appended claims, the term "cavity" means the space in the wall of the tank which is separate from the space inside the tank. This cavity comprises the interior of the pipe sections in Fig. 1 plus the space inside the ports 14, or the space inside the helical pipe 23 in Fig. 4, or the space between the walls 25 and 26 in Fig. 5.

Throughout this specification and the appended claims, the term "chamber" means that space on the inside of the tank which is adapted to storage or reaction of fluids under pressure.

When any of the tanks of my invention are used for storing or reacting fluids at high pressures, these fluids are introduced into the tank chamber through the conduits 13. The conduits 16 are then connected to a high pressure source of an inert gas such as nitrogen. The cavity in the wall of the tank is permitted to fill with this inert gas until the gauge 19 indicates a pressure inside the cavity different from the pressure of the fluids inside the chamber as indicated by the gauge 21. When this pressure is reached, the valves 17 in the conduits 16 are closed, sealing off the cavity in the tank wall. If the pressure should subsequently change in the chamber or if the pressure in the cavity should change because of thermal expansion or contraction of the gas therein, the pressure in the cavity should be adjusted by opening one of the valves 17 or venting one of the pipes 16.

If either wall of the tank were to fail, it is quite probable that the interior wall would fail before the exterior wall would, because the interior wall is subjected to corrosion by the fluids contained in the tank. Furthermore, it is more probable that the interior wall would fail than that the weld between two of the pipes would fail because the weld is thicker than the wall. If then the interior wall should develop a leak the pressure indicated on the gauge 19 would increase or decrease respectively depending upon whether the pressure in the chamber is greater than or less than the pressure in the cavity. If for some reason the exterior wall should fail before the interior wall fails, the pressure indicated on the gauge 19 would drop to atmospheric pressure.

Therefore, a workman periodically comparing the gauges 19 and 21 would know that the interior wall had failed if the gauges indicated the same pressure or that the exterior wall had failed if the gauge 19 indicated atmospheric pressure with this knowledge he could empty the tank of its dangerous contents before an accident occurred. He would also know, as indicated above, which wall had failed, and hence which wall to repair before refilling the chamber. If the contents of the chamber had been maintained at atmospheric pressure, and one wall failed so that the pressure in the cavity fell to atmospheric pressure, no indication would be given as to which wall had failed, but a warning would be given that one wall had failed.

Instead of filling the cavity with an inert gas, the cavity may be filled with a heat-conducting fluid under the same pressure conditions as described above. This would permit the use of the cavity as a heat-exchanging jacket above the chamber. However, if the fluid is to be circulated through the chamber, the valves 17 must be properly adjusted to permit an equal rate of fluid flow therethrough if the pressure gauges are to be used in the same way as described above. If it is impractical to so regulate the valves 17, they should be opened at will but closed periodically for a short time when the gauges 19 and 21 are observed.

The form of my invention illustrated in Fig. 1 is preferred over the other forms illustrated, and over the tanks known to the art, because of the added strength in resisting tank failure provided by the closed circular sections of pipe. This added strength is due to the fact that a torus, which is the geometric figure described by each pipe section, will withstand a greater tangential tensile stress than will a solid ring of the same weight.

The helical pipe form of my invention illustrated in Fig. 4 is preferred over that illustrated in Fig. 5 for somewhat the same reasons, and the form illustrated in Fig. 4 is preferred over all other forms when the tank is used as a heat exchanger because the fluid in the cavity in the tank wall in this form is forced to flow continuously around the entire area of the tank. When the tanks of my invention are used as heat exchangers, the form illustrated in Figs. 1 through 4 are preferable to the form illustrated in Fig. 5 because they provide a greater heat-exchanging surface inside the tank than does the form illustrated in Fig. 5.

The form of my invention illustrated in Fig. 1 may be very advantageously used as a heat exchanger where it is desirable to control the temperatures of specific parts of the tank. If the tank is to be half filled with a liquid and half filled with a gas, the pipe sections encircling the lower half of the tank would be connected by ports 14 as would the pipe sections encircling the upper half of the tank, but there would be no ports connecting the two halves. Heat exchanging fluids at two different temperatures would then be circulated through the pipe sections encircling the two different halves, so that the gas in the upper half of the tank might be cooled while the liquid in the lower half of the tank was heated or vice-versa.

Other modes of applying the principle of the invention may be employed, change being made as regards the details described, provided the features stated in any of the following claims or the equivalent of such be employed.

I, therefore, particularly point out and distinctly claim as my invention:

1. A pressure tank comprising a plurality of closed circular sections of pipe in juxtaposition ad welded together to enclose a chamber; each pipe section having at least one port therein which connects with similar ports in the adjacent pipe sections; means for introducing fluids into and withdrawing fluids from said chamber; means for maintaining a fluid inside said pipe sections at a pressure different from the pressure of the fluid inside said chamber; and means for indicating when the pressure of the fluid inside the pipe sections varies from a predetermined range.

2. A pressure tank comprising a plurality of closed circular sections of pipe in juxtaposition and welded together to enclose a circular chamber; each pipe section having at least one port therein which connects with similar ports in the adjacent pipe sections; means for introducing fluids into and withdrawing fluids from said chamber; means for maintaining a fluid inside said pipe sections at a pressure exceeding the pressure of the fluid inside said chamber; and means for indicating when the pressure of the fluid inside the pipe sections fall below a predetermined value.

References Cited in the file of this patent

UNITED STATES PATENTS

| | | |
|---|---|---|
| 2,000,780 | Miller | May 7, 1935 |
| 2,314,442 | Cook | Mar. 23, 1943 |
| 2,631,015 | Probst | Mar. 10, 1953 |
| 2,718,014 | Mizrach et al. | Sept. 20, 1955 |

FOREIGN PATENTS

| | | |
|---|---|---|
| 176,591 | Germany | June 26, 1905 |
| 430,521 | France | Aug. 11, 1911 |
| 1,007,254 | France | Feb. 6, 1952 |